United States Patent
Mori et al.

(10) Patent No.: US 9,489,167 B2
(45) Date of Patent: Nov. 8, 2016

(54) DISPLAY CONTROL APPARATUS AND CONTROL METHOD THEREFOR

(71) Applicant: CANON KABUSHIKI KAISHA, Tokyo (JP)

(72) Inventors: Kurumi Mori, Kawasaki (JP); Tomohiro Ota, Kawasaki (JP); Toshimichi Ise, Yokohama (JP); Akio Yoshikawa, Tokyo (JP); Kyota Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 14/444,917

(22) Filed: Jul. 28, 2014

(65) Prior Publication Data

US 2015/0035723 A1 Feb. 5, 2015

(30) Foreign Application Priority Data

Jul. 30, 2013 (WO) .................. PCT/JP2013/070554

(51) Int. Cl.
*G06F 3/14* (2006.01)
*H04N 5/77* (2006.01)
*H04N 9/804* (2006.01)

(52) U.S. Cl.
CPC ........... *G06F 3/1446* (2013.01); *G06F 3/1454* (2013.01); *H04N 5/772* (2013.01); *H04N 9/8042* (2013.01); *G09G 2300/026* (2013.01); *G09G 2340/0492* (2013.01)

(58) Field of Classification Search
None
See application file for complete search history.

(56) References Cited

U.S. PATENT DOCUMENTS

| | | | | |
|---|---|---|---|---|
| 5,559,554 A * | 9/1996 | Uekane | ................... | H04N 5/77 348/333.02 |
| 6,201,554 B1 * | 3/2001 | Lands | ................... | G06F 1/1626 345/156 |
| 2005/0111042 A1 * | 5/2005 | Ogiwara | ............ | H04N 1/00127 358/1.18 |
| 2007/0047943 A1 * | 3/2007 | Seo | ........................ | G03B 17/02 396/141 |
| 2009/0258638 A1 * | 10/2009 | Lee | ................... | H04M 1/72583 455/418 |
| 2010/0048194 A1 * | 2/2010 | Park | ...................... | G06F 1/1626 455/418 |
| 2013/0120635 A1 * | 5/2013 | Kim | ................... | H04N 5/23219 348/333.06 |
| 2013/0250158 A1 * | 9/2013 | Yamauchi | .......... | H04N 5/23219 348/333.06 |

FOREIGN PATENT DOCUMENTS

| | | |
|---|---|---|
| JP | 2000-165718 A | 6/2000 |
| JP | 2002-320118 A | 10/2002 |
| JP | 2005-110138 A | 4/2005 |
| JP | 2007-150898 A | 6/2007 |

* cited by examiner

*Primary Examiner* — Kent Chang
*Assistant Examiner* — Nathan Brittingham
(74) *Attorney, Agent, or Firm* — Canon U.S.A., Inc. IP Division

(57) ABSTRACT

A display unit that moves into a first position and a second position with respect to a main body portion includes setting, where the display unit is in the first position, any of a plurality of settings including a first setting, with which a normal image of an image is displayed, and a second setting, with which a mirror image of an image is displayed, and displaying, where the display unit is in the second position with the first setting, an image that has an orientation opposite to that of the image displayed when the display unit is in the first position with the first setting, and when the display unit is in the second position with the second setting, an image is displayed with the same orientation as the image displayed when the display unit is in the first position with the second setting.

16 Claims, 11 Drawing Sheets

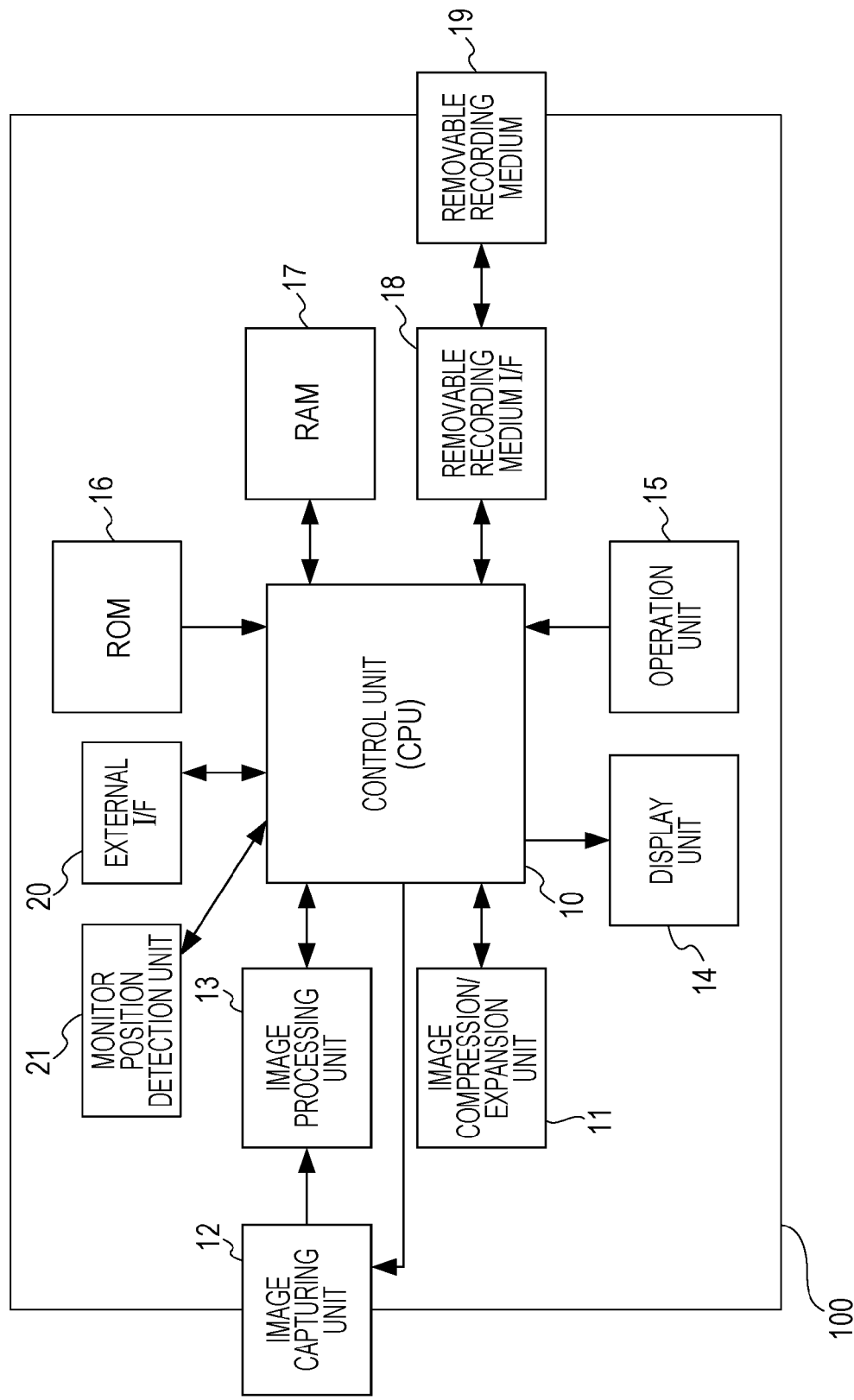

FIG. 10A

| | FLIPPING OFF | FLIPPING ON |
|---|---|---|
| NORMAL RECORDING IMAGE | R → Я (901) | R → Я (902) |
| FLIPPING RECORDING IMAGE | Я → R (903) | Я → R (904) |

FIG. 10B

| | FLIPPING OFF | FLIPPING ON |
|---|---|---|
| NORMAL RECORDING IMAGE | R → Я | R → Я |
| FLIPPING RECORDING IMAGE | Я → R | Я → R |

FIG. 10C

| | FLIPPING OFF | FLIPPING ON |
|---|---|---|
| NORMAL RECORDING IMAGE | R → Я | R → Я |
| FLIPPING RECORDING IMAGE | Я → R | Я → R |

FIG. 10D

| | FLIPPING OFF | FLIPPING ON |
|---|---|---|
| NORMAL RECORDING IMAGE | R → Я | R → Я |
| FLIPPING RECORDING IMAGE | Я → R | Я → R |

FIG. 10E

| | FLIPPING OFF | FLIPPING ON |
|---|---|---|
| NORMAL RECORDING IMAGE | R | Я |
| FLIPPING RECORDING IMAGE | Я | R |

## DISPLAY CONTROL APPARATUS AND CONTROL METHOD THEREFOR

FIELD

Aspects of the present invention generally relate to a display control apparatus, and more particularly to a display control apparatus that displays a mirror image of an image.

BACKGROUND

Display control apparatuses having a vari-angle system such as video cameras and mobile telephone terminals are generally known, with the vari-angle system a display for displaying a moving image that is being captured being rotatable so as to be oriented in an image capturing direction. In PTL 1, for mobile telephone terminals with such a vari-angle system, it has been proposed that, for a captured image, switching is performed between normal image display and mirror image display in accordance with the orientation of a display with respect to an image capturing direction.

CITATION LIST

Patent Literature

PTL 1 Japanese Patent Laid-Open No. 2007-150898 PTL 1 does not consider a case where a captured image is flipped left to right so as to be a mirror image and recorded. In the case where a captured image is flipped left to right so as to be a mirror image and recorded, it is considered that display is performed in which a mirror image the same as a moving image to be recorded is displayed even when a display surface of a display is oriented in a direction opposite to the image capturing direction. From a state in which a mirror image is displayed in this manner, if a flipping signal is issued and flipping is performed as in PTL 1 when the display surface of the display is oriented in the image capturing direction, the mirror image is flipped and as a result a normal image with respect to a subject is displayed. However, from such display, it is not recognizable whether or not a mirror image of a moving image currently being captured is recorded. In addition, in terms of left and right, a moving image viewed from the subject and displayed on the display moves in a direction opposite to that of the subject, and thus it is difficult to adjust composition.

SUMMARY

Aspects of the present invention provide a display control apparatus that performs user-friendly display even when the orientation of a display is changed in the case where a mirror image of an image is displayed.

According to an aspect of the present disclosure, a display control apparatus includes a display unit configured to move into a first position and into a second position with respect to a main body portion, an acquisition unit configured to acquire an image, a setting unit configured to set, in a case where the display unit is in the first position, any of a plurality of settings including a first setting, with which a normal image of the image acquired by the acquisition unit is displayed, and a second setting, with which a mirror image of the image acquired by the acquisition unit is displayed, and a display control unit configured to perform control such that, in a case where the first setting has been set, a normal image of the image acquired by the acquisition unit is displayed when the display unit is in the first position, and a mirror image of the image acquired by the acquisition unit is displayed when the display unit is in the second position, and in a case where the second setting has been set, a mirror image of the image acquired by the acquisition unit is displayed when the display unit is in the first position, and a mirror image of the image acquired by the acquisition unit is displayed when the display unit is in the second position.

Further features of the present disclosure will become apparent from the following description of exemplary embodiments with reference to the attached drawings.

BRIEF DESCRIPTION OF DRAWINGS

FIG. 2 is a block diagram of the configuration of the digital camera 100.
FIGS. 10A to 10E are diagrams for describing a display state of a flipping icon.

DESCRIPTION OF EMBODIMENTS

Exemplary embodiments will be described with reference to the drawings.

Figure 1A:
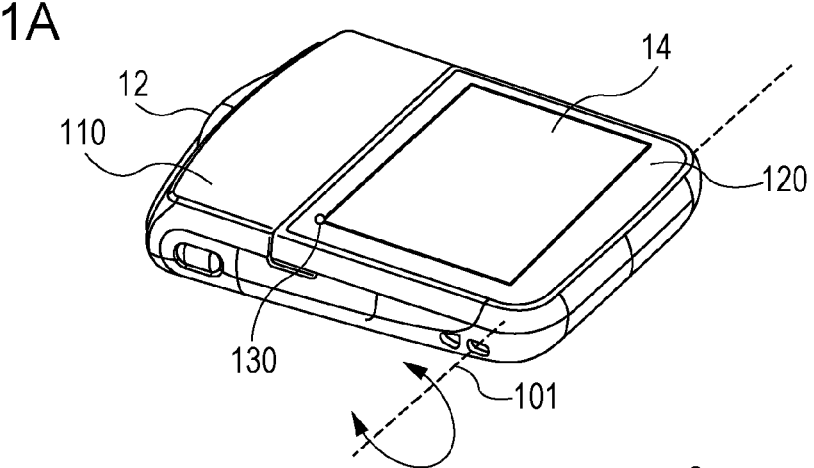
FIGS. 1A to 1C are external views of a digital camera 100.
Figure 1B:
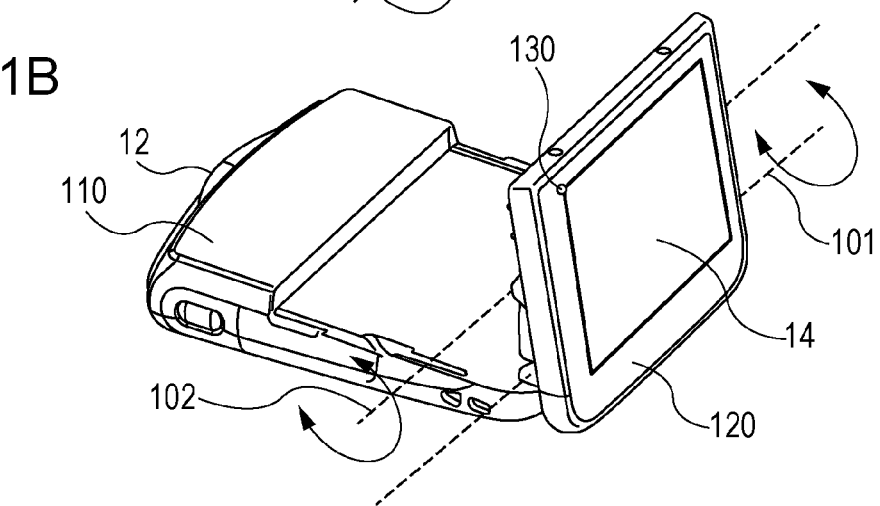
Figure 1C:
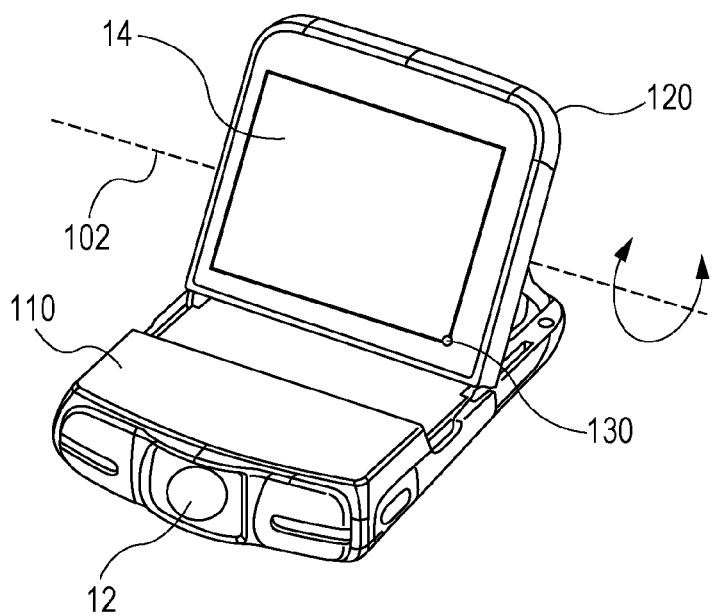

FIG. 1A to FIG. 1C illustrate external views of the digital camera 100 as an embodiment of a display control apparatus of the present invention.

A main body portion 110 of the digital camera 100 includes an image capturing unit 12 (an illustrated portion is an image capturing lens portion included in the image capturing unit), the image capturing unit 12 facing a subject. Moreover, a monitor portion 120 includes a display unit 14. The monitor portion 120 is coupled to the main body portion 110 via a hinge unit, rotates about an axis 101 and an axis 102, and may change a position thereof with respect to the main body portion 110 as in FIG. 1A to FIG. 1C. An origin 130 illustrates the coordinates of an origin of the display unit 14, and is a point whose X coordinate is 0 and whose Y coordinate is 0. The origin 130 is defined as a point at the upper left of the display unit 14.

FIG. 1A illustrates a positional relationship in which the monitor portion 120 is closed with respect to the main body portion such that a display surface of the display unit 14 is exposed. This position is called a closed position.

FIG. 1B illustrates a state (an open state) in which the closed monitor portion 120 has been rotated from the closed position of FIG. 1A about the axis 101 by approximately 90 degrees and the monitor portion 120 has been raised from the main body portion 110. This position is called an open position. In the open position, as illustrated, the display surface of the display unit 14 and an image capturing surface of the image capturing unit 12 are oriented in opposite directions. That is, the display unit 14 is used as a backside monitor.

FIG. 1C illustrates a state in which the monitor portion 120 has been rotated from the open position of FIG. 1B about the axis 102, which is parallel to a horizontal direction of the display unit 14, by approximately 180 degrees. This position is called a face-to-face position. In the face-to-face position, as illustrated, the display surface of the display unit 14 and the image capturing surface of the image capturing unit 12 are oriented in the same direction. That is, the display surface of the display unit 14 may be observed from a subject side and is used as a front-facing monitor. In the face-to-face position, as illustrated, the origin 130 at the upper left of the display unit 14 is positioned at the lower right when viewed from a user. Their positional relationship is apparently flipped upside down and left to right compared with that of the open position. Thus, in order to show the same moving image to the user in the open position and in the face-to-face position, it is necessary to perform processing on an image displayed when the monitor portion 120 is in the open position such that the image is flipped upside down and left to right or such that the image is rotated by 180 degrees, and display the resulting image. Note that the same resulting image is displayed regardless of whether the image is processed so as to be flipped upside down and left to right or so as to be rotated by 180 degrees. Thus, in the following, a 180-degree rotation process may also be substituted for what is simply described as a process in which an image is flipped upside down and left to right.

FIG. 2 illustrates a block diagram of the configuration of the digital camera 100. Components in the following are connected to a control unit 10 (CPU). An image compression/expansion unit 11, the image capturing unit 12, an image processing unit 13, the display unit 14, an operation unit 15, a ROM 16, a RAM 17, a removable recording medium interface (I/F) (18), an external interface (I/F) (20), and a monitor position detection unit 21. The control unit and the components are made to be able to transmit and receive data to and from each other.

The control unit 10 is a system control unit that controls the entirety of a system of the digital camera 100. The control unit 10 controls the components by expanding, in the RAM 17, a program recorded in the ROM 16 and executing the program, and executes a flowchart to be described later. The ROM 16 is a non-volatile recording medium, and a program to be executed by the control unit 10 is stored therein. The RAM 17 is a volatile recording medium to be used as a work memory of the control unit 10. In addition, the RAM 17 is used to perform a compression process or an expansion process on image data obtained by performing image processing using the image processing unit 13 on image data captured by the image capturing unit 12, and on image data read from a removable recording medium 19, the compression process or the expansion process being performed in the image compression/expansion unit 11. Moreover, the RAM 17 is also used as a VRAM for temporary storage, in order to perform display on the display unit 14. Furthermore, the RAM 17 is also used as a RAM for temporarily storing property information, which is associated with a captured image and recorded.

A recording medium for recording image data may be inserted into the digital camera 100. For realizing this, the digital camera 100 includes the removable recording medium I/F (18) as an interface. The removable recording medium I/F (18) is a slot into which a removable recording medium such as a memory card is insertable. FIGS. 1A to 1C illustrate an example in which the removable recording medium (19) is inserted into the removable recording medium I/F (18). The digital camera 100 has been described to have a configuration with which image data is recorded in a removable recording medium; however, a configuration may also be considered with which image data is recorded in a non-removable memory built in the digital camera 100.

The image processing unit 13 performs certain pixel interpolation, a resizing process, a color conversion process, a rotation process, a left-right conversion process, a top-bottom conversion process, and a top-bottom left-right conversion process on image data captured by the image capturing unit 12. Moreover, certain arithmetic processing is performed using captured image data in the image processing unit 13, and the control unit 10 performs various types of control (exposure control, auto white balance control, and the like) regarding image capturing performed by the image capturing unit 12 in accordance with an obtained arithmetic result.

The image compression/expansion unit 11 performs a process for compressing image data on which image processing has been performed by the image processing unit 13 and a process for expanding image data read from the removable recording medium 19.

The image capturing unit 12 includes an image capturing lens (including a zoom lens and a focus lens) and an image capturing element, captures an image of a subject in accordance with control performed by the control unit 10, and acquires image data such as still image data and moving image data.

The display unit 14 is a display for displaying, in accordance with control performed by the control unit 10, various setting states, an image being captured by the image capturing unit 12, an image read from a removable recording medium and played back, and the like. In this embodiment, the display unit 14 is configured as a vari-angle liquid crystal monitor.

The operation unit 15 is an operation unit for receiving instructions from a user, the operation unit including a power-supply switch for supplying power to the digital camera 100, an image capturing start button, a mode switching button with which switching may be performed to a camera mode (an image capturing mode) or to a playback mode, a touch panel, and the like. The touch panel and the display unit 14 are integrally provided as an operation member.

The external interface (I/F) (20) is an interface for external devices, and is a communication interface for transmitting or receiving image data or other data to and from an external device in a wireless or wired manner or a moving-image output interface for outputting a moving image signal to an external device.

The monitor position detection unit 21 detects a relative positional relationship of the monitor portion 120 with respect to the main body portion 110. The monitor position detection unit 21 may be constituted by a switch, a hall element, and the like with which the hinge unit is provided, and may detect whether the monitor portion is positioned in the closed position, the open position, or the face-to-face position.

Figure 3A:
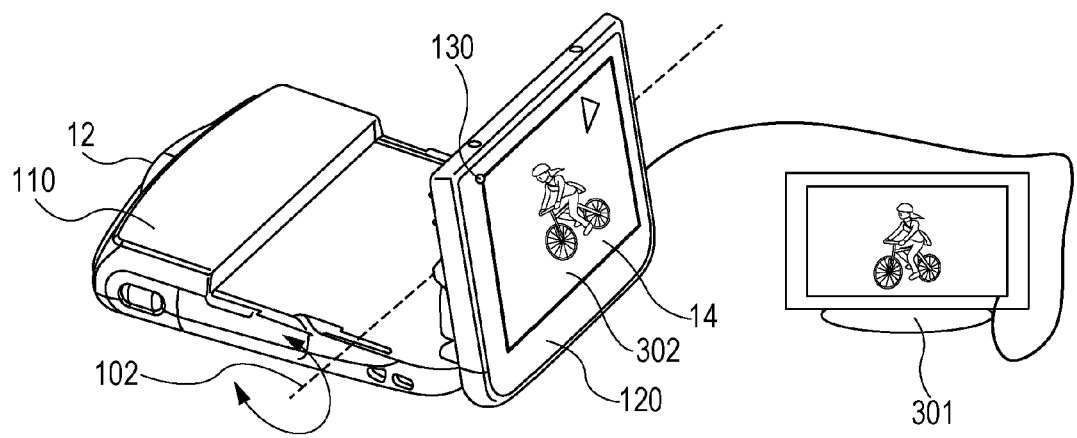
FIGS. 3A and 3B are examples of playback display of the digital camera 100 and a television 301.
Figure 3B:
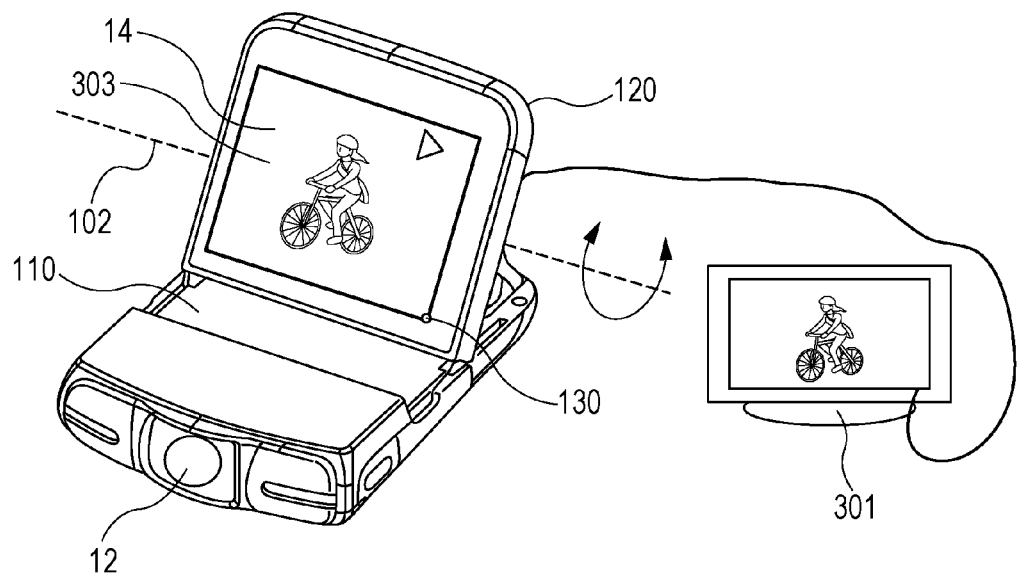

FIG. 3A and FIG. 3B illustrate examples of playback display on the digital camera 100 and a television 301 serving as an example of an external device.

FIG. 3A is an example of display performed when the monitor portion 120 is arranged in the open position. An image read from the removable recording medium 19 is played back and a playback image 302 on which a rotation process or a flipping process has not been performed is displayed on the display unit 14. The image the same as that displayed on the display unit 14 is simply displayed on a display unit 14 of an external device 301 connected via the external I/F (20) without undergoing a rotation process or a flipping process.

FIG. 3B is an example of display performed when the monitor portion 120 is arranged in the face-to-face position. An image (a playback image 303) obtained by performing processing such that an image read from the removable recording medium 19 is flipped upside down and left to right is displayed on the display unit 14. Thus, in the case where display based on the same image is performed, the playback image 302 displayed in FIG. 3A and the playback image 303 displayed in FIG. 3B have a relationship in which, in terms of up and down, the playback images 302 and 303 are in the opposite orientations with respect to the origin 130 as a reference. Note that, as illustrated in the drawings, the playback image 302 and the playback image 303 seem to be in the same orientation when viewed from the user. In this manner, even when the monitor portion 120 is rotated and a direction is changed in which the monitor portion 120 is viewed, an image may be observed in the same orientation when viewed from the user. An image whose source is the same as that of an image displayed on the display unit 14 is simply displayed on the display unit 14 of the external device 301 connected via the external I/F (20) without undergoing a rotation process or a flipping process, the image being different from the playback image 303 obtained by flipping the image upside down and left to right.

A flipping recording mode may be set for the digital camera 100. When the flipping recording mode is set, a captured image is flipped left to right and recorded in the removable recording medium 19. When an image recorded in the flipping recording mode is played back, an image that is a mirror image of a subject whose image has actually been captured is played back. The flipping recording mode is useful when choreography for a dance instructional material is shot. When a moving image of a choreography instructor dancing in the usual way is captured at the time of image capturing, an image, a mirror image, is played back with any playback apparatus at the time of playback. Thus, learners may practice just as they face and see the moving image in terms of left and right. The flipping recording mode is also useful when a form during playing sport such as a golf swing is shot.

Figure 4A:
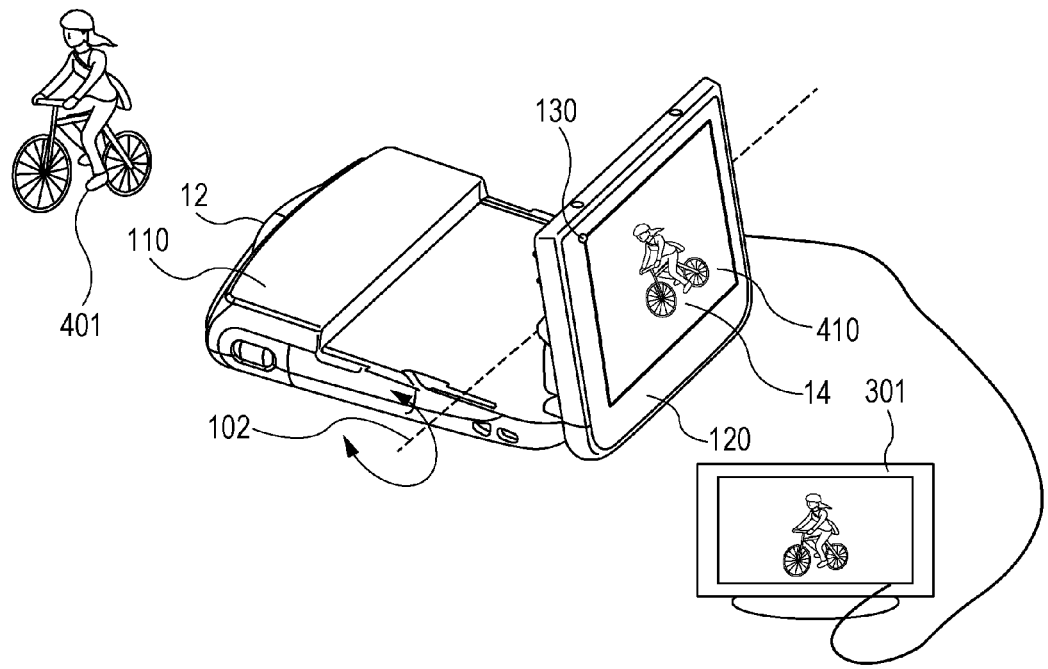
FIGS. 4A and 4B are examples of display in the case where a flipping recording mode is set to off in the digital camera 100 and the television 301.
Figure 4B:
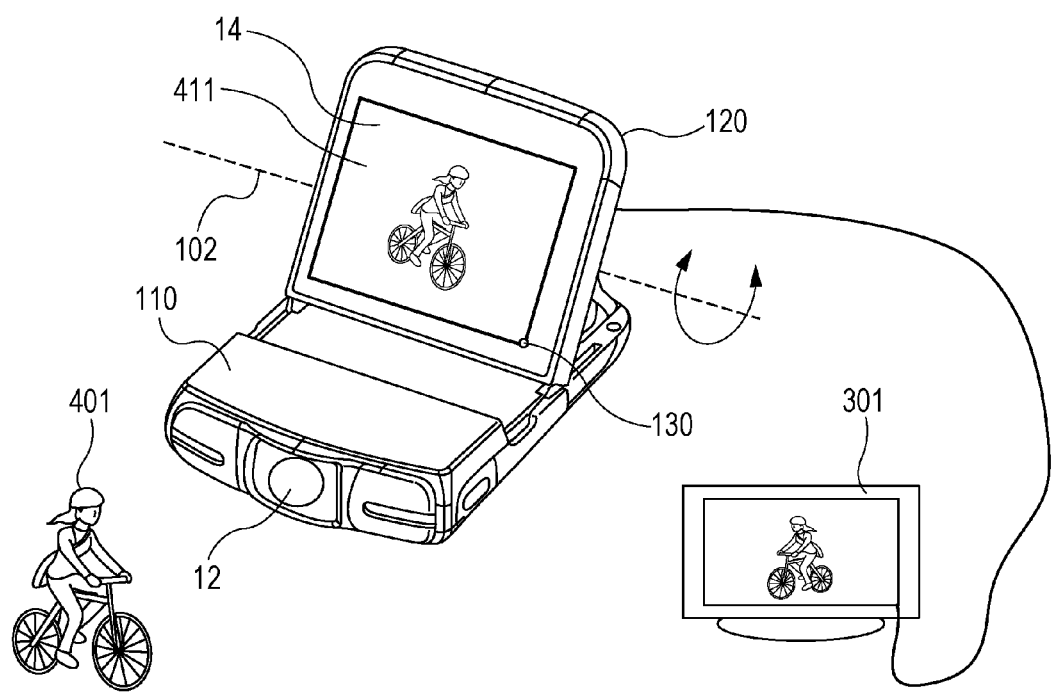

FIG. 4A and FIG. 4B illustrate examples of display (live view display when image capturing is on standby and live view display during capturing and recording of an image) performed when an image is captured in the case where the flipping recording mode is set to off. FIG. 4A is an example of display performed in the case where the monitor portion 120 is arranged in the open position and an image of a subject 401 is captured. A captured image is simply displayed on the display unit 14 without undergoing a flipping process or a rotation process, and a live view image 410 is displayed. When viewed from a person who performs shooting and observes the display unit 14 from the back surface side, a side opposite to the side where the image capturing unit 12 is provided, the subject 401 and the live view image 410 seem to be in the same orientation in terms of left and right. A moving image the same as an image to be recorded in the removable recording medium 19 is output to and displayed on the television 301, which is an external device.

FIG. 4B is an example of display performed in the case where the monitor portion 120 is arranged in the face-to-face position and an image of the subject 401 is captured. A positional relationship between the digital camera 100 and the subject 401 is the same as that of the case of FIG. 4A except that a position from which viewing is performed is different, and it is supposed that the same moving image is captured. Similarly to as in the case of playback, if a captured image is flipped upside down and left to right and displayed, when viewed from the subject 401, the subject 401 in the displayed image moves, in terms of left and right, in a direction opposite to that of the subject 401 although the displayed image is a normal moving image. As a result, it is difficult for the subject 401 to perform composition adjustment such as staying, as intended, in an area whose image is being captured or strike a pose. Thus, in the case where the monitor portion 120 is in the face-to-face position, as in FIG. 4B, a mirror image of the moving image is displayed (mirror display). When viewed from the user, this live view image 411 has, in terms of left and right, an orientation opposite to that of the live view image 410 displayed when the monitor portion 120 is in the open position. Since, when viewed from the subject, the subject in the live view image 411 displayed in this manner moves in the same direction as the subject just like when looking in the mirror, it is easier for the user to perform composition adjustment such as staying, as intended, in an area whose image is being captured or strike a pose. In order to display a mirror image, a captured image is processed so as to be flipped upside down. The captured image is not flipped left to right. When viewed from the user, the orientation of the monitor portion 120 is vertically and horizontally opposite to that of the monitor portion 120 arranged in the open position. Thus, if the captured image is flipped only upside down, mirror image display is achieved. Note that, like a moving image displayed on the television 301, a moving image to be output to an external device and an image to be recorded in the removable recording medium 19 are normal images, and only an image to be displayed on the display unit 14 arranged in the face-to-face position is changed to a mirror image.

Figure 5A:
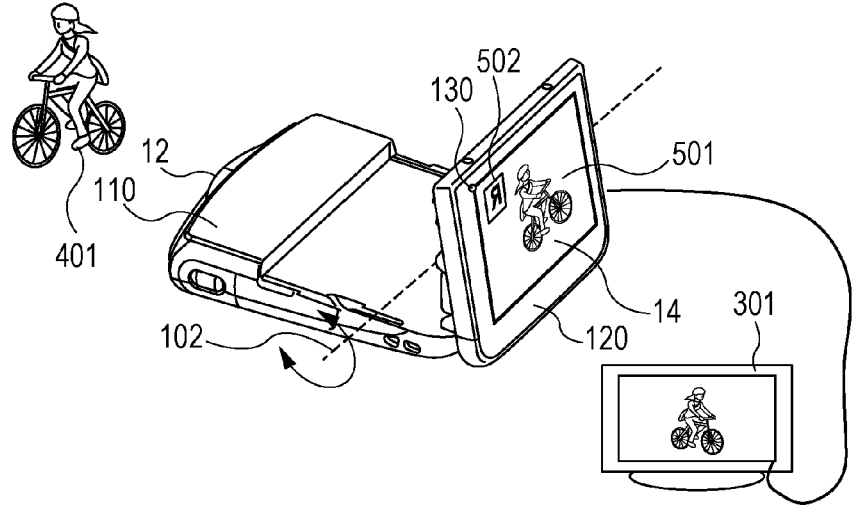
FIGS. 5A to 5C are examples of display in the case where the flipping recording mode is set to on in the digital camera 100 and the television 301.
Figure 5B:
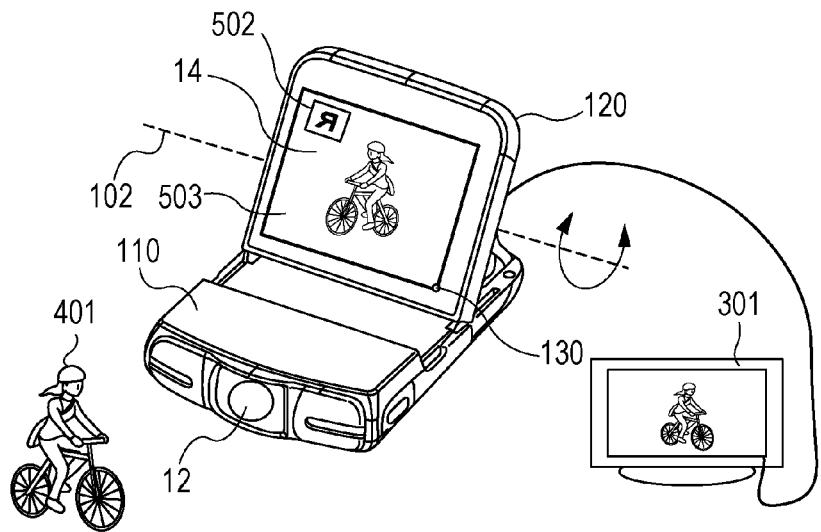
Figure 5C:
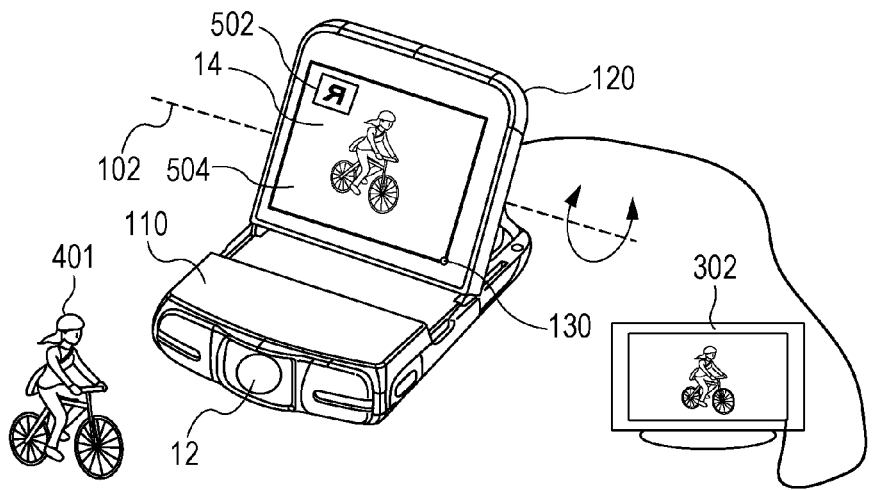

FIG. 5A and FIG. 5C illustrate examples of display (live view display when image capturing is on standby and live view display during capturing and recording of an image) performed when an image is captured in the case where the flipping recording mode is set to on. FIG. 5B is an example of display in the case where the flipping recording mode is set to on but the present application is not performed.

FIG. 5A is an example of display performed in the case where the flipping recording mode is set to on, the monitor portion 120 is arranged in the open position, and an image of the subject 401 is captured. Since flipping recording is turned on, a captured image is flipped left to right and displayed on the display unit 14 and a live view image 501, a mirror image, is displayed. When viewed from the person who performs shooting and observes the display unit 14 from the back surface side, a side opposite to the side where the image capturing unit 12 is provided, the subject 401 has, in terms of left and right, an orientation opposite to that of the live view image 501. As a result, it may be recognized that the flipping recording mode is on and a captured image is flipped left to right and then the mirror image is recorded. In addition, a mode icon 502 indicating that the flipping recording mode is on is displayed on the live view image 501 in a superimposition manner. A moving image, which is a mirror image, the same as an image to be recorded in the removable recording medium 19 is output to and displayed on the television 301, which is an external device.

Normally, when the monitor portion 120 is rotated from the open position to the face-to-face position, the moving image, which has been being displayed so far, is flipped left to right and mirror image display is performed. However, in the case where the flipping recording mode is set to on, when the moving image, which has been being displayed so far, is flipped left to right and displayed in accordance with rotation of the monitor portion 120 from the open position to the face-to-face position, display as in FIG. 5B is performed. A live view image 503 is a displayed image obtained by further flipping, left to right, the live view image 501 displayed as a mirror image. As processing, the live view image 503 is an image obtained by simply flipping the live view image 501 upside down. As a result, the live view image 503 is a normal image obtained by flipping the captured image upside down and left to right. When the subject sees the live view image 503 like this, since the subject sees a moving image in which, in terms of left and right, the subject moves in a direction and an orientation opposite to those of his/her movement, it is difficult to stay in an area whose image is being captured or strike a pose. Furthermore, since a normal image is displayed, it is difficult to determine whether or not the flipping recording mode is on just by looking at the live view image 503. That is, there is particularly no merit in display when viewed from the subject. Thus, in the present embodiment, display as in FIG. 5C is performed in the case where the face-to-face position is chosen in the flipping recording mode.

FIG. 5C is an example of display performed in the case where the flipping recording mode is set to on, the monitor portion 120 is arranged in the face-to-face position, and an image of the subject 401 is captured. A positional relationship between the digital camera 100 and the subject 401 is the same as that of the case of FIG. 5A except that a position from which viewing is performed is different, and it is supposed that the same moving image is captured. In the case where the flipping recording mode is on and the monitor portion 120 is in the face-to-face position, as in FIG. 5C, a mirror image of the moving image is displayed. A live view image 504 is a mirror image obtained by rotating the live view image 501, which is a displayed mirror image, by 180 degrees. As processing, the live view image 504 is an image obtained by flipping the captured image only upside down. When viewed from the user, this live view image 504 has, in terms of left and right, the same orientation as the live view image 501 displayed when the monitor portion 120 is in the open position. When the subject sees the live view image 504 like this, since the subject sees a moving image in which the subject moves, in terms of left and right, in a direction and an orientation the same as those of his/her movement in terms of left and right, it is easy to stay in an area whose image is being captured or strike a pose. Although it is difficult to determine whether or not the flipping recording mode is on just by looking at the live view image 504, it is clear that the flipping recording mode is on since the mode icon 502 is displayed. Note that the mode icon 502 is flipped upside down and left to right from the case of FIG. 5A and is displayed at a position that and the display position are symmetric with respect to the center, which is an axis, of the display unit 14. A moving image, which is a mirror image (an image obtained by flipping a captured image left to right), the same as an image to be recorded in the removable recording medium 19 is output to and displayed on the television 301, which is an external device.

Figure 6:
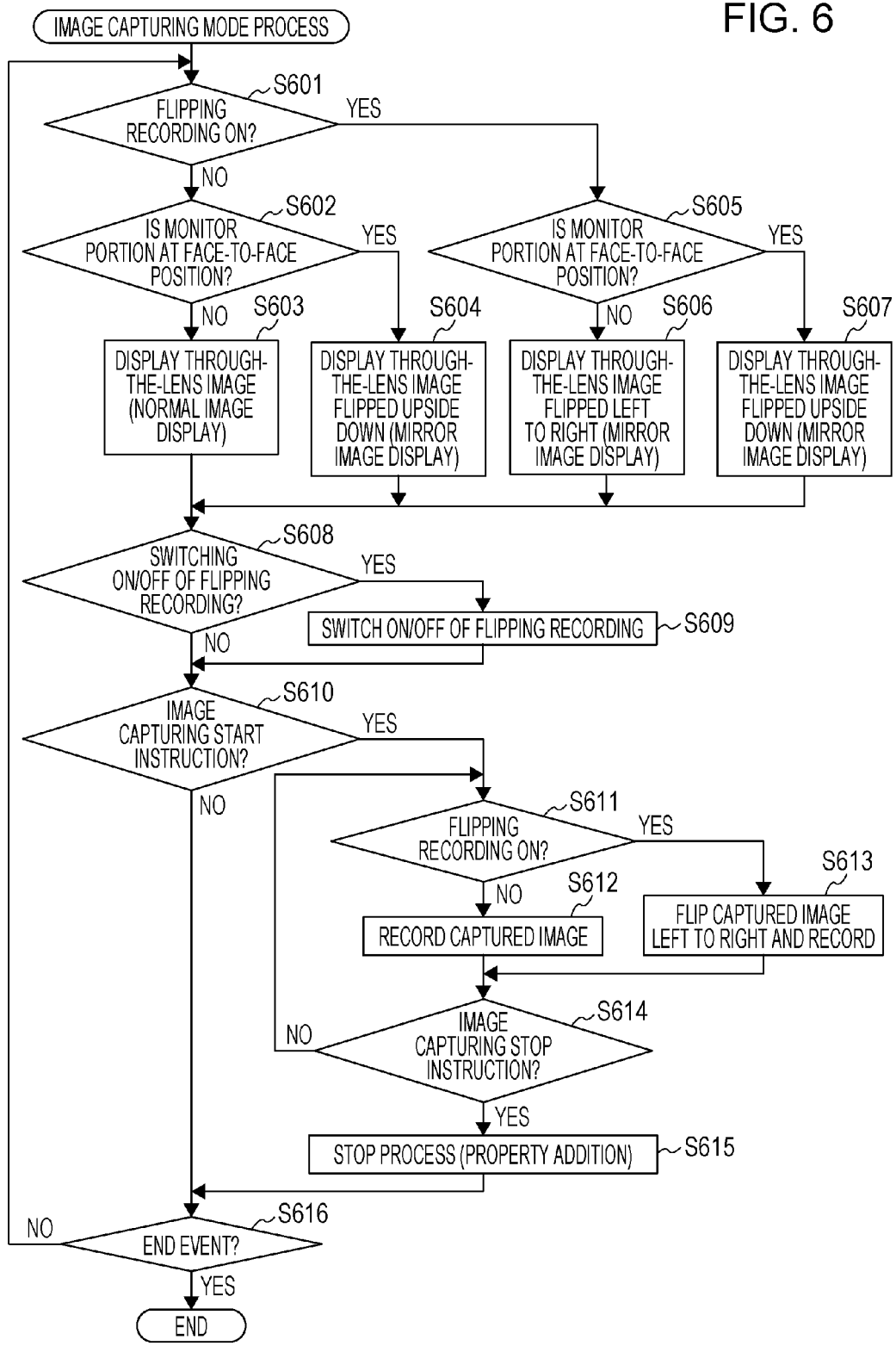
FIG. 6 is a flowchart of an image capturing mode process.

FIG. 6 is a flowchart of an image capturing mode process. A process for realizing the above-described display is described. The process of FIG. 6 is realized by expanding, in the RAM 17, a program recorded in the ROM 16 and executing the program using the control unit 10. When the digital camera 100 is started up in the image capturing mode, the process of FIG. 6 is started.

In S601, the control unit 10 refers to mode information recorded in the ROM 16, and determines whether or not the flipping recording mode is currently on. In the case where the flipping recording mode is off, the process proceeds to S602. In the case where the flipping recording mode is on, the process proceeds to S605.

In S602, the control unit 10 determines whether or not the monitor portion 120 is in the face-to-face position, in accordance with an output of the monitor position detection unit 21. In the case where the monitor portion 120 is not in the face-to-face position, that is, the monitor portion 120 is in the closed position or the open position, the process proceeds to S603. In the case where the monitor portion 120 is in the face-to-face position, the process proceeds to S604.

In S603, the control unit 10 displays a through-the-lens image (a live view image) captured by the image capturing unit 12 on the display unit 14 in the original orientation of the through-the-lens image without undergoing a flipping/rotation process. As a result, display is performed in the open position as in FIG. 4A.

In S604, the control unit 10 causes the image processing unit 13 to perform processing such that a through-the-lens image (a live view image) captured by the image capturing unit 12 is flipped upside down, and displays the resulting image on the display unit 14. As a result, mirror image display is performed in the face-to-face position as in FIG. 4B.

In S605, the control unit 10 determines whether or not the monitor portion 120 is in the face-to-face position, in accordance with an output of the monitor position detection unit 21. In the case where the monitor portion 120 is not in the face-to-face position, that is, the monitor portion 120 is in the closed position or the open position, the process proceeds to S606. In the case where the monitor portion 120 is in the face-to-face position, the process proceeds to S607.

In S606, the control unit 10 causes the image processing unit 13 to perform processing such that a through-the-lens image (a live view image) captured by the image capturing unit 12 is flipped left to right, and displays the resulting image on the display unit 14. In addition, the mode icon 502 indicating that the flipping recording mode is on is displayed on the live view image in a superimposition manner. As a result, mirror image display is performed in the open position as in FIG. 5A.

In S607, the control unit 10 causes the image processing unit 13 to perform processing such that a through-the-lens image (a live view image) captured by the image capturing unit 12 is flipped upside down, and displays the resulting image on the display unit 14. In addition, the mode icon 502 indicating that the flipping recording mode is on is flipped upside down and left to right and displayed on the live view image in a superimposition manner. As a result, mirror image display is performed in the face-to-face position as in FIG. 5C.

In S608, the control unit 10 determines whether or not an on/off switching operation for the flipping recording mode has been performed by the user. Regarding on/off of the flipping recording mode, a user may arbitrarily set on or off in a state in which an item for switching on/off of the flipping recording mode included in a setting menu is selected and a switching screen is displayed. In the case where an on/off switching operation for the flipping recording mode has been performed by the user, the process proceeds to S609. Otherwise, the process proceeds to S610.

In S609, the control unit 10 switches on/off of the flipping recording mode set in accordance with a user operation and records mode information indicating a state of a switching result in the ROM 16.

In S610, the control unit 10 determines whether or not the image capturing start button of the operation unit 15 has been pressed and it has been commanded that capturing of a moving image be started. When it is determined that it has been commanded that capturing of a moving image be started, the process proceeds to S611. Otherwise, the process proceeds to S616.

In S611, the control unit 10 refers to the mode information recorded in the ROM 16, and determines whether the flipping recording mode is on or off. In the case where the flipping recording mode is off, the process proceeds to S612. In the case where the flipping recording mode is on, the process proceeds to S613.

In S612, the control unit 10 records a moving image captured by the image capturing unit 12 in the removable recording medium 19 without changing the orientation of the moving image.

In S613, the control unit 10 causes the image processing unit 13 to perform processing such that a moving image captured by the image capturing unit 12 is flipped left to right and records the resulting moving image in the removable recording medium 19. In this manner, a moving image, which is a mirror image of the captured image, is recorded.

In S614, the control unit 10 determines whether or not the image capturing start button of the operation unit 15 has been pressed again and an image capturing stop instruction has been issued. In the case where an image capturing stop instruction has been issued, the process proceeds to S615. Otherwise, the process returns to S611 and image capturing is continued.

In S615, the control unit 10 performs a stop process. That is, property information, various types of information obtained at the time of image capturing, is added to a moving-image file in which a moving image recorded in the removable recording medium 19 is stored (the property information is associated with the moving image and recorded), and a final closing process is performed. Here, property information indicating whether or not the moving image is a moving image recorded with the flipping recording mode ON (a left-right flipping flag) is also recorded. The left-right flipping flag is recorded in the header information of the moving-image file, an associated management file, or a management file created in a folder the same as that of the moving-image file.

In S616, the control unit 10 determines whether or not there is an end event that causes the image capturing mode process to end. An end event occurs in the case where an operation for switching off the power source is detected, an operation for changing the image capturing mode to another operation mode such as the playback mode is detected, or it is detected that the covering of a slot for storing a recording medium such as a memory card has been opened. In the case where there is no end event, the process returns to S601 and the image capturing mode process is continued. In the case where there is an end event, the process of FIG. 6 ends.

Note that, in the above-described process, an example has been described in which a moving image is captured in the flipping recording mode; however, a still image may also be captured in the flipping recording mode. For a still image captured in a flipping image-capturing mode, a mirror image, which is a still image, obtained by flipping the captured image left to right is recorded as an image file.

In addition, in the case where the flipping recording mode is on, an example has been described in which the mode icon 502 is displayed together with the live view image; however, the mode icon 502 does not have to be displayed. By not displaying the mode icon 502, a portion that is covered by the mode icon 502 and may not be observed may be prevented from occurring in the live view image and the live view image may be displayed with better visibility. In addition, in the case of S607, since whether the flipping recording mode is on is not determined just from the live view image, the mode icon 502 may be displayed only in the case where the flipping recording mode is on and image capturing is performed in the face-to-face position, that is, as in FIG. 5C. Even when the flipping recording mode is on, in the case of the closed position and in the case of the open position (in the case of S606), the mode icon 502 is not displayed. Instead, the live view image may be displayed with better visibility without including a covered portion of the live view image. Even when the mode icon 502 is not displayed, since the live view image is flipped and displayed, it may be recognized that the flipping recording mode is on. In addition, in the case where the flipping recording mode is on, the mode icon 502 is displayed regardless of the position of the monitor portion 120; however, it may be considered that a display state in the case of the face-to-face position is made to be different from that in other cases. For example, for display of the mode icon 502 in the face-to-face position, it may be considered that at least one of display in a larger size than in the other cases, display in an outstanding color (for example, red), and display in a blinking manner is performed. For display of the mode icon 502 in the other cases, not in the face-to-face position, display of the mode icon 502 in a smaller size than in the case of the face-to-face position, display in an undistinguished color (for example, white), display in a continuous illumination manner, or the like is performed. As a result of this, also, in the case of the face-to-face position in which it tends particularly not to be recognized that the flipping recording mode is on, it is possible to assuredly cause the user to recognize that the flipping recording mode is on. In addition, in the other positions, live view display may be prevented from being disturbed as much as possible. Note that the mode icon 502 does not have to be in the above-described state, and has only to be displayed information which is different from live view display and by which the user may recognize that the mode is the flipping recording mode. For example, a character string such as "flipping recording mode ON" may also be displayed.

Note that an example has been described in which the monitor portion 120 is rotatable about the axis 102; however, a vari-angle system is not limited to this. In another embodiment, a live view image may be moved into the face-to-face position oriented in the image capturing direction (the subject side) and into the position oriented in a direction opposite to the image capturing direction. For example, a configuration with which the monitor portion 120 may be rotated about an axis parallel to the display surface of the display unit 14 and perpendicular to the axis 102, that is, an axis parallel to a vertical direction of the display unit 14. In this case, in any of the above-described S604, S606, and S607, mirror image display is performed by not flipping the through-the-lens image upside down but flipping the through-the-lens image left to right. In addition, in the case where the position is changed from the open position to the face-to-face position in the playback mode, a playback image is not flipped or rotated and is displayed without undergoing orientation changing.

As described above, regardless of whether mirror image display has been performed in a position that is not the face-to-face position, mirror image display is performed in the face-to-face position in which a display unit that displays a live view is oriented in an image capturing direction (the subject side). In addition, regardless of whether a mirror image of a captured image is recorded, mirror image display is performed in the face-to-face position. As a result, in image capturing, adjustment of composition viewed from the subject side is made easier. In this case, if an operation mode for recording a mirror image has been set, information is displayed indicating that the operation mode for recording a mirror image has been set. Thus, even when mirror image display is performed in the face-to-face position, it is possible to cause the user to recognize whether or not the operation mode for recording a mirror image has been set. In addition, in the case where the display unit is not in the face-to-face position, if a mirror image of a captured image has been recorded, mirror image display is also performed. Consequently, even when notification is not performed through an icon or the like, it is possible to cause the user to recognize that the operation mode for recording a mirror image has been set.

Note that a description has been made in which the control unit 10 performs control in the above-described image capturing mode process. As described above, one hardware device may perform control, or a plurality of hardware devices may also share processing and perform control over the entire apparatus. In addition, the case where control corresponding to the image capturing mode process is applied to the digital camera 100 has been described as an example. However, this example is not limiting any display control apparatus provided with a display unit whose position may be moved is applicable. That is, display units can include personal computers, PDAs, mobile telephone terminals, music players, game machines, electronic book readers, and the like.

A method for playing back an image recorded in the above-described process of FIG. 6 in the display control apparatus according to the present embodiment will be described. Note that the process described in the following is a process performed when a recorded image is played back, and thus the process may be performed not only by the digital camera 100 but also by other display control apparatuses.

As in the above-described image capturing mode process, an image to be played back may be an image (a flipped image) that has been obtained by flipping an image left to right and recorded at the time of image capturing. In addition, in the present embodiment, playback may also be performed by performing a process for flipping an image left to right at the time of playback. As a result, when a normal image is also played back, which has been recorded without undergoing left-right flipping, mirror image (flipped image) display may be performed by performing processing such that the normal image is flipped left to right at the time of playback. Thus, it is advantageous for dance practice and the like.

Note that since an image may be flipped left to right and recorded at the time of image capturing and a process may be performed such that an image is flipped left to right and the resulting image may be played back at the time of playback, the following four states occur.

(1) normal recording+normal playback→normal image
(2) normal recording+left-right flipping playback→flipped image
(3) left-right flipping recording+normal playback→flipped image
(4) left-right flipping recording+left-right flipping playback→normal image In the case where there are four such states, it may be difficult for a user to determine which state a playback image that the user is currently looking at is in. In addition, it is difficult for the user to picture what state an image flipped left to right at the time of playback is to be in, and thus it is difficult for the user to determine whether or not a left-right flipping function should be on for playback. In the process for image playback in the present embodiment, display is performed such that the user may easily determine a left-right flipping state in recording/playback and easily perform switching.

Figure 7A:
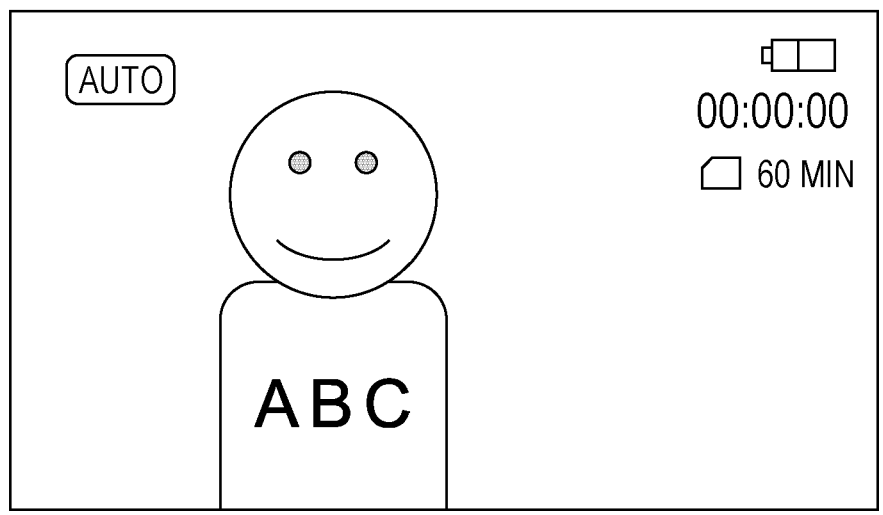
FIGS. 7A and 7B are diagrams illustrating examples of display of a moving image captured and recorded by turning on/off the flipping recording mode.

FIG. 7A illustrates an example of display performed in the case where the flipping recording mode is set to off and a moving image is captured and recorded. Note that, in addition to a live view, display of an image capturing mode icon, a remaining capacity of battery, an image capturing elapsed time, and a possible remaining time for image capturing omitted in FIGS. 5A to 5C is also illustrated.

In FIG. 7A, since the flipping recording mode is off, a normal image of characters "ABC" printed on a shirt of a person, a subject, is displayed.

Figure 7B:
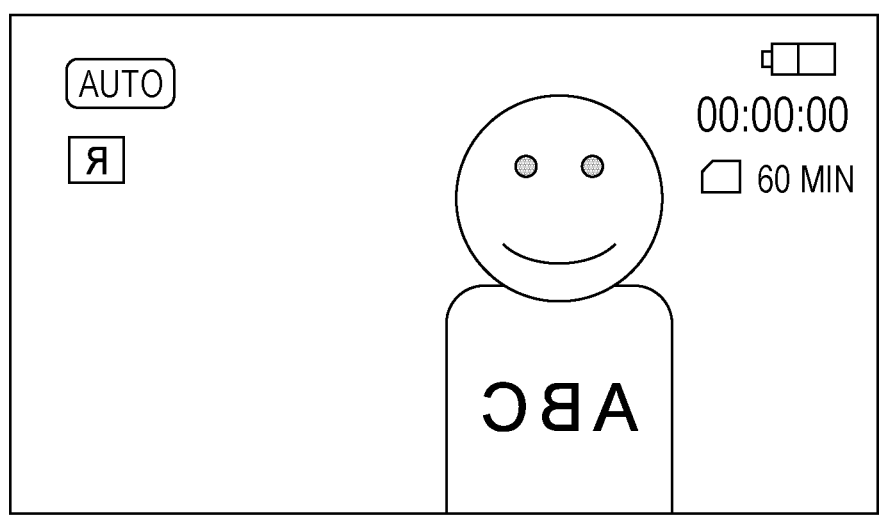

FIG. 7B illustrates an example of display performed in the case where the flipping recording mode is set to on and a moving image is captured and recorded. Since a mirror image is recorded in this case, the characters "ABC" on the shirt of the person, the subject, are displayed in a state in which the characters "ABC" are flipped left to right. An operation for playing back an image captured in this manner will be described.

Figure 8:
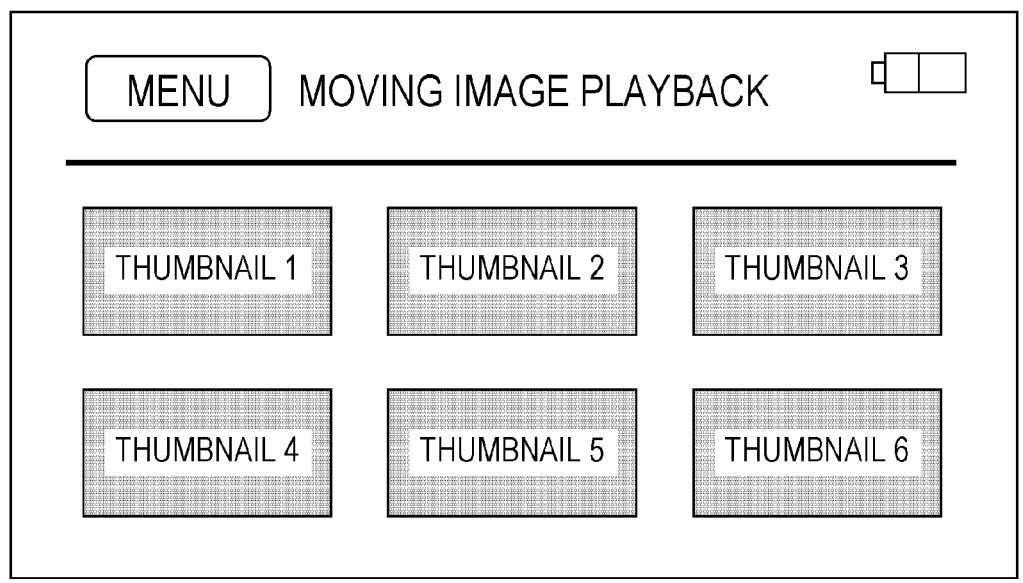
FIG. 8 is a diagram illustrating an example of display of an index screen in which thumbnails of a plurality of scenes (cuts) are arranged in a tile manner.

When an operation mode of the digital camera 100 is switched to a playback mode, an index screen in which thumbnails of a plurality of scenes (cuts) are arranged in a tile manner as in FIG. 8 is displayed on the display unit 14.

When one of the thumbnails is tapped (an operation for touching and releasing a touch panel configured integrally with the display unit 14), a moving image indicated by the tapped thumbnail is read from the removable recording medium 19 and played back. The moving image being played back may be flipped left to right in accordance with a user's operation. Then, a state based on whether the moving image being played back is a moving image recorded in the flipping recording mode and whether or not playback is performed by performing processing such that an image is flipped left to right (flipping playback is performed) is displayed using a flipping icon.

FIGS. 9A to 9D illustrate examples of screen display during playback of a moving image.

An icon representing a playback operation, a counter, a date, and the like are displayed. Flipping icons 901 to 904 are a display item arranged in the upper left of the screen. The flipping icons 901 to 904 are touch icons for indicating a state based on whether a moving image being played back is a moving image recorded in the flipping recording mode and whether or not flipping playback is performed and are touch icons for receiving an on/off switching operation for flipping playback. In the present embodiment, an icon using an alphabet character "R" as a motif (material) is used. Any motif may also be used as long as, like this "R", the motif is left-right asymmetric and something recognizable whether it is a normal image or a flipped image.

FIG. 10A illustrates, regarding display states of the flipping icons 901 to 904, a diagram of correspondences between whether or not recording has been performed in the flipping recording mode and whether or not flipping playback is performed. Information corresponding to this correspondence display is pre-recorded in the ROM 16.

An upper row of the diagram of correspondences indicates the case where an image is played back that has been normally recorded without undergoing left-right flipping at the time of image capturing, and a lower row indicates the case where an image is played back that has been obtained by flipping an image left to right and recorded at the time of image capturing.

A left column of the diagram of correspondences indicates the case where playback is performed without flipping an image left to right at the time of playback (that is, flipping OFF) and a right column indicates the case where playback is performed by flipping an image left to right at the time of playback (that is, flipping ON).

A motif on a source side of an arrow indicates flipping/non-flipping of a recorded moving image, which may be determined by the orientation of "R". That is, when the motif ("R") on the source side of the arrow (the left side of the arrow) is a normal image, it is clear that the recorded moving image is an image recorded with flipping recording OFF (that is, a recorded image is a normal image). When the motif ("R") on the source side of the arrow is a mirror image, it is clear that the recorded moving image is an image recorded with flipping recording ON (that is, a recorded image is a mirror image).

A motif on a pointing side of the arrow indicates a state of playback in the case where a flipping icon 900 (a general name for 901 to 904) is tapped and flipping playback is set to on. The state may be determined by the orientation of "R". That is, when the motif ("R") on the pointing side of the arrow (the right side of the arrow) is a normal image, it is clear that the orientation of an image displayed in the case where flipping playback is set to on is that of a normal image with respect to an actual subject. When the motif ("R") on the pointing side of the arrow (the right side of the arrow) is a mirror image, it is clear that the orientation of an image displayed in the case where flipping playback is set to on is that of a mirror image with respect to the actual subject. This flipping icon 900 is a flipping icon 900 that performs a toggle operation for switching active/inactive every time the flipping icon 900 is tapped. The base color of the flipping icon 900 (a display state of an external side of a motif portion in the icon) is changed. In the following diagrams, a diagonally shaded portion is colored in orange (one display state). In the case where the (diagonally shaded) portion is orange, the flipping icon 900 indicates active (that is, flipping ON), and in the case where the portion is black (the other display state), the flipping icon 900 indicates inactive (that is, flipping OFF). That is, if the base color of the flipping icon 900 is black, it is clear that flipping playback is currently off and the current state is a state represented by the motif on the source side of the arrow (the left side of the arrow). In addition, it is clear that, if the flipping icon 900 is tapped and flipping playback is set to on, the state is changed to a state represented by the motif on the pointing side of the arrow (the right side of the arrow). In contrast, if the base color of the flipping icon 900 is orange, it is clear that flipping playback is currently on and the current state is a state represented by the motif on the pointing side of the arrow (the right side of the arrow). In addition, it is clear that, if the flipping icon 900 is tapped and flipping playback is set to off, the state is changed to a state represented by the motif on the source side of the arrow (the left side of the arrow).

By display of a flipping icon of any of such four patterns, the user may easily recognize whether the image currently being played back has been flipped left to right at the time of image capturing. In addition, the user may also easily recognize whether, in terms of left and right, the orientation of the image currently being played back is the original orientation (that is, whether the image currently being played back is a normal image or a mirror image with respect to the actual subject). Furthermore, the user may also easily recognize whether or not the image currently being played back is an image on which a flipping process has been performed at the time of playback and then played back. Furthermore, the user may also easily recognize how an image is to be played back after the flipping icon 900 is pressed (that is, in the case where switching of on/off of a flipping process function is performed at the time of playback).

Figure 9A:
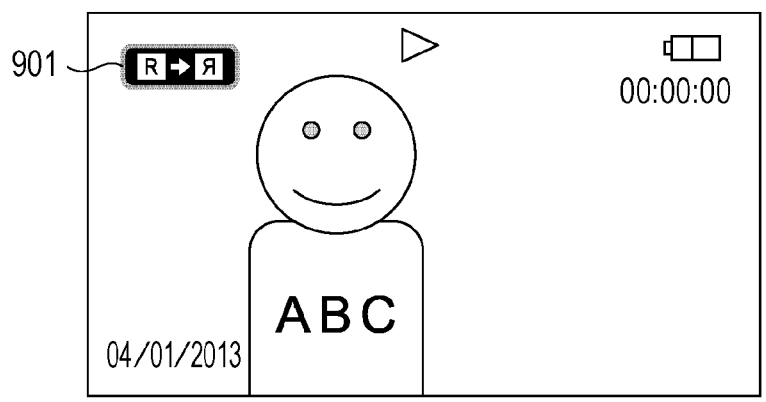
FIGS. 9A to 9D are diagrams illustrating one example of a screen during a moving image playback.
Figure 9B:
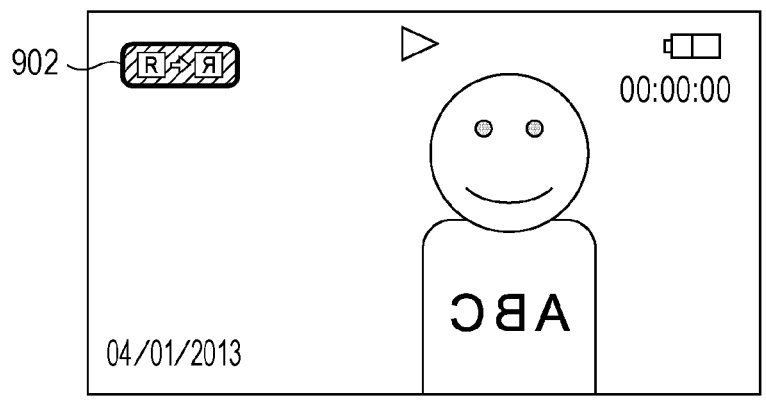
Figure 9C:
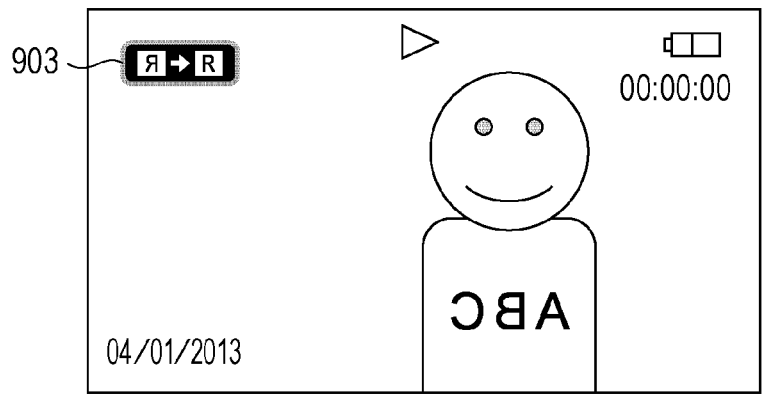
Figure 9D:
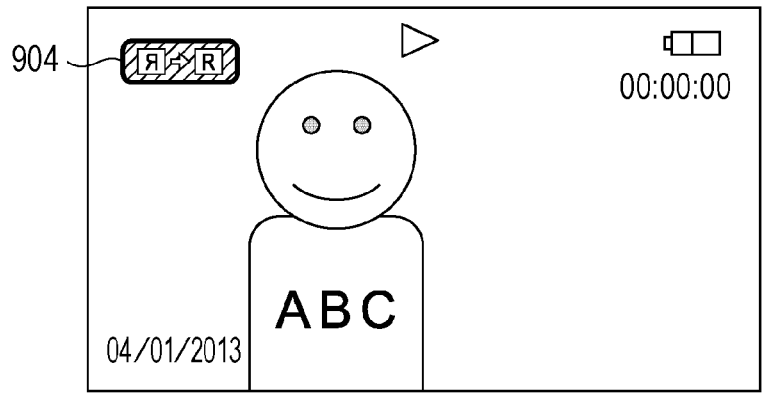

FIG. 9A illustrates a screen displayed when a normal recording image is played back with flipping playback OFF. In addition, FIG. 9B illustrates a screen displayed when a normal recording image is played back with flipping playback ON, FIG. 9C illustrates a screen displayed when a flipping recording image is played back with flipping playback OFF, and FIG. 9D illustrates a screen displayed when a flipping recording image is played back with flipping playback ON.

A process for performing the above-described playback display will be described.

Figure 11:
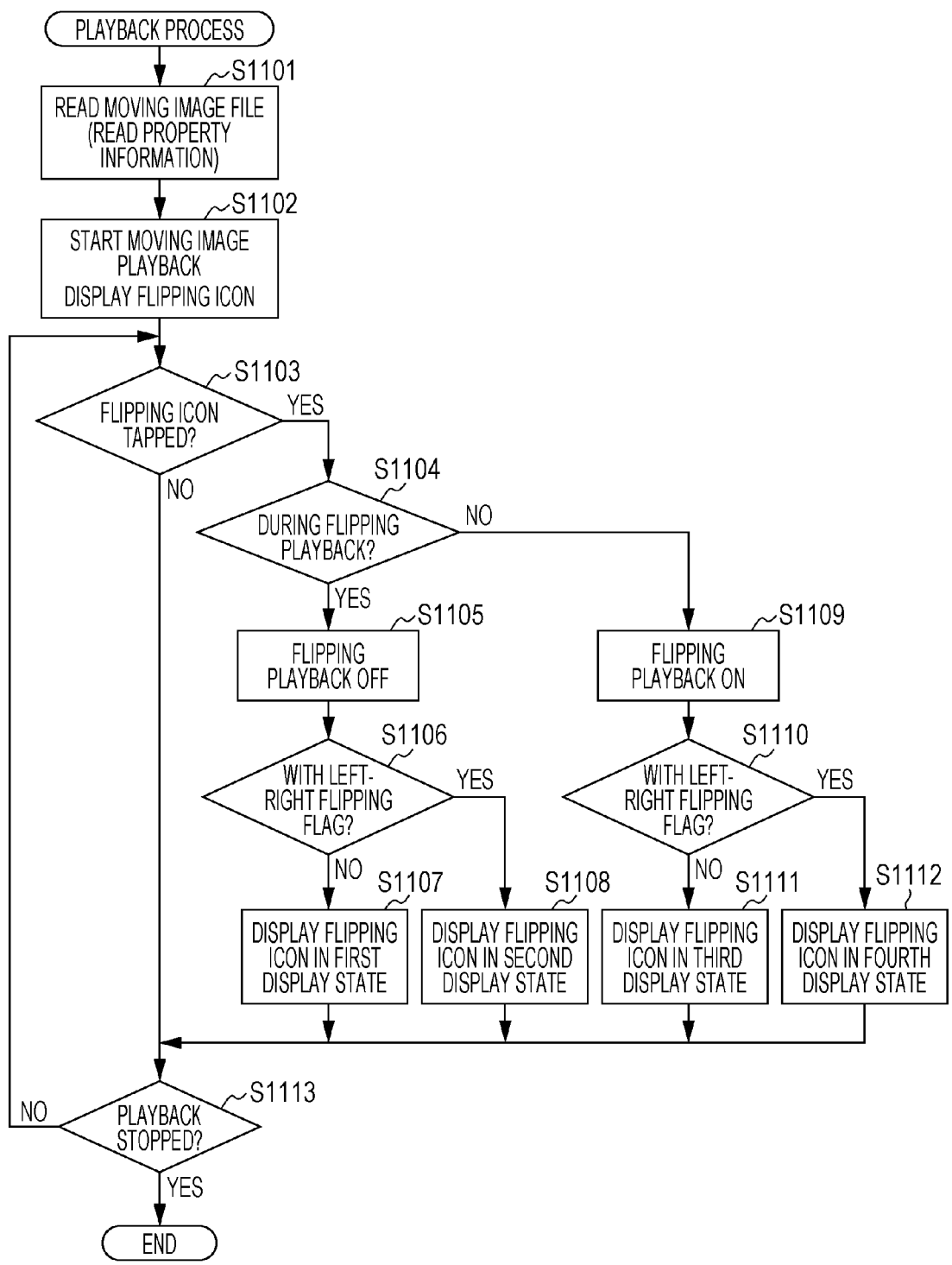
FIG. 11 is a flowchart of a playback process.

FIG. 11 illustrates a flowchart of a playback process in the playback mode. This process is realized by expanding, in the RAM 17, a program recorded in the ROM 16 and executing the program using the control unit 10. When the digital camera 100 is started up in the playback mode and any of thumbnails of moving images displayed on an index screen is tapped, the process of FIG. 11 is started.

In S1101, the control unit 10 reads a moving image corresponding to the tapped thumbnail from the removable recording medium 19. In addition, the control unit 10 reads property information of the moving image. If the read property information includes a left-right flipping flag, the moving image, which is to be played back, is a moving mirror image recorded in the flipping recording mode. If the left-right flipping flag is not included, the moving image, which is to be played back, is a normal image. Information regarding whether the left-right flipping flag is included is stored in the RAM 17.

In S1102, the control unit 10 plays back the moving image read in S1101 and displays the played back moving image on the display unit 14. In addition, initial rendering of the flipping icon 900 is performed on the basis of the information regarding the left-right flipping flag stored in the RAM 17. In S1102, flipping playback is not performed. Thus, for a moving image without a left-right flipping flag, display such as a display example of FIG. 9A is performed using the flipping icon 901 representing an upper left display state of FIG. 10A.

For a moving image with a left-right flipping flag, display such as a display example of FIG. 9C is performed using the flipping icon 903 representing a lower left display state of FIG. 10A.

In S1103, the control unit 10 determines whether or not a tap operation has been performed on the flipping icon 900. In the case where a tap operation has been performed on the flipping icon 900, the process proceeds to S1104. Otherwise, the process proceeds to S1113.

In S1104, the control unit 10 refers to the RAM 17, and determines whether or not flipping playback is currently performed. In the case where flipping playback is performed, the process proceeds to S1105. Otherwise, the process proceeds to S1109.

In S1105, the control unit 10 sets flipping playback to OFF and plays back a moving image, which is being displayed, without flipping from the point in time and displays the played back moving image. In addition, the control unit 10 records information indicating that flipping playback is off in the RAM 17.

In S1106, the control unit 10 refers to the RAM 17, and determines whether or not the moving image being played back is a moving image with a left-right flipping flag. In the case where the moving image being played back is a moving image with a left-right flipping flag, the process proceeds to S1108. Otherwise, the process proceeds to S1107.

In S1107, the control unit 10 displays the flipping icon 900 in the upper left display state (901) of FIG. 10A, which is a first display state. Here, a normal image of the moving image is displayed. As a result, display is performed as illustrated in FIG. 9A.

In S1108, the control unit 10 displays the flipping icon 900 in the lower left display state (903) of FIG. 10A, which is a second display state. Here, the recorded moving image is a mirror image, and thus a moving mirror image is displayed. As a result, display is performed as illustrated in FIG. 9C.

In contrast, in S1109, the control unit 10 sets flipping playback to on, performs playback by causing the image processing unit 13 to perform processing such that the moving image is flipped left to right from the point in time, and displays the played back moving image. In addition, the control unit 10 records information indicating that flipping playback is on in the RAM 17.

In S1110, the control unit 10 refers to the RAM 17, and determines whether or not the moving image being played back is a moving image with a left-right flipping flag. In the case where the moving image being played back is a moving image with a left-right flipping flag, the process proceeds to S1112. Otherwise, the process proceeds to S1111.

In S1111, the control unit 10 displays the flipping icon 900 in an upper right display state (902) of FIG. 10A, which is a third display state. Here, a mirror image of the moving image is displayed. As a result, display is performed as illustrated in FIG. 9B.

In S1112, the control unit 10 displays the flipping icon 900 in a lower right display state (904) of FIG. 10A, which is a fourth display state. Here, the recorded moving image is a mirror image, and thus a normal moving image obtained by further flipping the recorded moving image left to right is displayed. As a result, display is performed as illustrated in FIG. 9D.

In S1113, the control unit 10 determines whether or not there is a user's instruction for stopping playback of a moving image or whether the moving image has been played back till the end and is in a state in which playback is stopped. In the case where playback is stopped, the process of FIG. 11 ends. Otherwise, the process returns to S1103 and is repeated.

Modified Example 1

FIG. 10B is a diagram illustrating an example in which a flipping icon is displayed in a manner different from that of the above-described embodiment. Flipping icons are flipping icons having a certain display state in which flipping icons at an upper left position, an upper right position, at a lower left position, and a lower right position indicate different states. Each of the flipping icons at such positions indicates the same state as the flipping icon arranged at the same position in FIG. 10A.

In FIG. 10B, a motif on a source side of an arrow indicates flipping/non-flipping of a recorded moving image. A motif on a pointing side of the arrow indicates a state of playback performed when this moving image is flipped. A (diagonally shaded) portion colored in orange indicates a current state.

This flipping icon is a flipping icon for performing a toggle operation for switching a (diagonally shaded) position colored in orange every time the flipping icon is tapped, and switching of flipping/non-flipping of playback is performed.

Since a motif representing a current status is displayed in orange in an enhancement manner in this embodiment, the current state is easily recognized.

Modified Example 2

FIG. 10C is a diagram illustrating an example in which a flipping icon is displayed in a manner different from that of the above-described embodiments. Flipping icons are flipping icons having a certain display state in which flipping icons at an upper left position, an upper right position, at a lower left position, and a lower right position indicate different states. Each of the flipping icons at such positions indicates the same state as the flipping icon arranged at the same position in FIG. 10A.

In FIG. 10C, the orientation of a motif on a source side of an arrow indicates flipping/non-flipping of a recorded moving image. The orientation of the motif on a pointing side of the arrow indicates a state of playback performed when this flipping icon is tapped and flipping playback is on.

This flipping icon is a flipping icon for performing a toggle operation for switching active/inactive every time the flipping icon is tapped. When the base color of the flipping icon is colored in orange (diagonally shaded), the flipping icon indicates active. When the base color is black, the flipping icon indicates inactive. In addition, a (diagonally shaded) portion colored in orange indicates a current state.

Since, in this embodiment, a motif representing a current status is displayed in orange in an enhancement manner and it is clear from the base color whether or not flipping playback is performed, it is easily recognized whether or not the current image is a mirror image and whether or not flipping playback is ON.

Modified Example 3

FIG. 10D is a diagram illustrating an example in which a flipping icon is displayed in a manner different from that of the above-described embodiments. Flipping icons are flipping icons having a certain display state in which flipping icons at an upper left position, an upper right position, at a lower left position, and a lower right position indicate different states. Each of the flipping icons at such positions indicates the same state as the flipping icon arranged at the same position in FIG. 10A.

In FIG. 10D, the orientation of a motif on a source side of an arrow indicates flipping/non-flipping of a recorded moving image. The orientation of the motif on a pointing side of the arrow indicates a state of playback performed when this flipping icon is tapped and flipping playback is on.

This flipping icon is a flipping icon for performing a toggle operation for switching active/inactive every time the flipping icon is tapped. When the base color of the flipping icon is orange (diagonally shaded), the flipping icon indicates active. When the base color is black, the flipping icon indicates inactive. In addition, the orientation of a large motif indicates a current state.

Since, in this embodiment, a motif representing a current status is displayed large in an enhancement manner and it is clear from the base color whether or not flipping playback is performed, it is easily recognized whether or not the current image is a mirror image and whether or not flipping playback is ON.

Modified Example 4

FIG. 10E is a diagram illustrating an example in which a flipping icon is displayed in a manner different from that of the above-described embodiments. Flipping icons are flipping icons having a certain display state in which flipping icons at an upper left position, an upper right position, at a lower left position, and a lower right position indicate different states. Each of the flipping icons at such positions indicates the same state as the flipping icon arranged at the same position in FIG. 10A.

In FIG. 10E, this flipping icon is a flipping icon for performing a toggle operation for switching active/inactive every time the flipping icon is tapped. The base color of the flipping icon indicates ON/OFF of flipping playback.

When the base color is white, playback is performed with flipping OFF. When the base color is orange (diagonally shaded), which is an effective color, playback is performed with flipping ON. In either case, the orientation of a motif indicates whether an image currently being displayed is a normal image or a mirror image with respect to an actual subject. Flipping/non-flipping of a recorded image may be determined by the orientation of the motif in the case where the base color of the flipping icon is white. In addition, whether or not an image displayed when flipping playback is on is a mirror image with respect to the actual subject may be determined by the orientation of the motif in the case where the base color of the flipping icon is orange. In this embodiment, four states may be shown while a space for flipping icon parts is reduced in an area of a playback screen.

As described above, a display control apparatus according to the present embodiment includes playback means that plays back an image, acquisition means that acquires information regarding whether or not the image played back by the playback means has been flipped and recorded, flipping process means that flips the image played back by the playback means and displays the resulting image, switching means that performs switching as to whether or not a flipping process is performed by the flipping process means, and control means that performs control such that a display item indicating whether the image has been flipped and displayed is displayed together with the image played back by the playback means on a display unit in a display state that differs depending on a combination of the information acquired by the acquisition means and whether or not switching has been performed such that the flipping process is performed by the switching means. As a result, in an apparatus that may perform switching between active/inactive of left-right flipping at the time of recording and between active/inactive of left-right flipping at the time or playback, (1) normal recording+normal playback→normal image
(2) normal recording+left-right flipping playback→flipped image
(3) left-right flipping recording+normal playback→flipped image
(4) left-right flipping recording+left-right flipping playback→normal image from among the four states, it may be displayed which state a playback image the user is currently looking at is in, such that the user may easily determines the state.

As a result, it enables a user to easily determine how an operation is performed when switching of left-right flipping playback is performed.

In any of the examples of FIG. 10A to FIG. 10E, it is possible to cause the user to easily recognize whether or not the image being played back has been flipped left to right at the time of image capturing, whether or not the image currently being played back represents the original orientation in terms of left and right, and whether or not current playback is being performed while performing flipping. Furthermore, it is also possible to cause the user to easily recognize how an image is to be played back in the case where switching of on/off of flipping playback is performed by tapping the flipping icon.

Note that a moving image has been described as an example of an image in the above-described embodiments; however, the image is not limited to a moving image and may also be a still image. In addition, left-right flipping has been described in the present embodiments; however, flipping upside down may be similarly applied also at the time of recording and at the time of playback.

Note that control performed by the control unit 10 in the above-described processes may be performed by one hardware device, or control over the entire apparatus may also be performed by a plurality of hardware devices by sharing processing.

In addition, in the process performed at the time of playback in the above-described embodiments, a digital camera 100 has been described as an example. However, any apparatus that may play back a moving image/a still image that has been flipped left to right and recorded is applicable. For example, personal computers, PDAs, mobile telephone terminals, mobile image viewers, printer devices provided with a display, digital photo frames, music players, game machines, electronic book readers, and the like.

The above-described embodiments are not seen to be limiting and includes various embodiments that fall within the range that does not depart from the aspects of the present disclosure. Furthermore, any combination of the above-described embodiments are applicable.

Other Embodiments

Additional embodiments are realized by executing a process to be described below. That is, the process is a process in which a piece of software (program) that realizes functions of the above-described embodiments is supplied to a system or an apparatus via a network or various types of storage medium and a program code is read and executed by a computer (or a CPU, an MPU, or the like) of the system or the apparatus.

According to the present disclosure, even when the orientation of a display is changed in the case where a mirror image of an image is displayed, display may be performed that is user friendly and intuitive for a user who looks at the display.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2013/070554, filed Jul. 30, 2013, which is hereby incorporated by reference herein in its entirety.

The invention claimed is:

1. A display control apparatus comprising:
an image capturing unit;
a display unit configured to move into a first position where a display surface of the display unit is oriented in a direction different from a direction in which the image capturing unit performs image capturing and into a second position where the display surface of the display unit is oriented in the direction in which the image capturing unit performs the image capturing, with respect to a main body portion;
a setting unit configured to set, in a case where the display unit is in the first position, any of a plurality of settings including a first setting, with which a normal image of the image captured by the image capturing unit is displayed, and a second setting, with which a mirror image of the image captured by the image capturing unit is displayed; and
a display control unit configured to perform control such that, in a case where the first setting has been set, a normal image of the image captured by the image capturing unit is displayed when the display unit is in the first position, and a mirror image of the image captured by the image capturing unit is displayed when the display unit is in the second position, and in a case where the second setting has been set, a mirror image of the image captured by the image capturing unit is displayed when the display unit is in the first position, and a mirror image of the image captured by the image capturing unit is displayed when the display unit is in the second position,
wherein, in both of the case where the first setting has been set and the case where the second setting has been set, a mirror image of the image captured by the image capturing unit is displayed when the display unit is in the second position.

2. The display control apparatus according to claim 1, wherein
the second position is a position into which the display unit is rotated from the first position treating a horizontal direction of the display unit as an axis, and
the display control unit performs control, in the case where the first setting has been set by the setting unit, such that the image captured by the image capturing unit is displayed without undergoing orientation changing when the display unit is in the first position, and the image captured by the image capturing unit is flipped upside down and displayed when the display unit is in the second position, and
in the case where the second setting has been set by the setting unit, such that the image captured by the image capturing unit is flipped left to right and displayed when the display unit is in the first position, and the image captured by the image capturing unit is flipped upside down and displayed when the display unit is in the second position.

3. The display control apparatus according to claim 2, wherein the display control unit performs control such that, in the case where a recorded image recorded in a recording medium is played back and displayed, the recorded image is displayed without undergoing orientation changing when the display unit is in the first position, and the recorded image is flipped upside down and left to right or rotated by 180 degrees and displayed when the display unit is in the second position.

4. The display control apparatus according to claim 1, wherein the second position is a position into which the display unit is rotated from the first position treating a vertical direction of the display unit as an axis, and
the display control unit performs control, in the case where the first setting has been set by the setting unit, such that the image captured by the image capturing unit is displayed without undergoing orientation changing when the display unit is in the first position, and the image captured by the image capturing unit is flipped left to right and displayed when the display unit is in the second position, and
in the case where the second setting has been set by the setting unit, such that the image captured by the image capturing unit is flipped left to right and displayed when the display unit is in the first position and also when the display unit is in the second position.

5. The display control apparatus according to claim 4, wherein the display control unit performs control such that, in the case where a recorded image recorded in a recording medium is played back and displayed, the recorded image is displayed without undergoing orientation changing when the display unit is in the first position and also when the display unit is in the second position.

6. The display control apparatus according to claim 1, wherein the display control unit performs control, in the case where the second setting has been set by the setting unit, such that information that differs from the image captured by the image capturing unit and indicates that the second setting has been set is displayed on the display unit.

7. The display control apparatus according to claim 6, wherein the display control unit performs control such that the information is displayed in a display state when the display unit is in the first position and in another display state when the display unit is in the second position, the display state being different from the other display state.

8. The display control apparatus according to claim 7, wherein the display control unit performs control such that the information is displayed larger when the display unit is in the second position than when the display unit is in the first position.

9. The display control apparatus according to claim 7, wherein the display control unit performs control such that the information is displayed in a more outstanding color when the display unit is in the second position than when the display unit is in the first position.

10. The display control apparatus according to claim 7, wherein the display control unit performs control such that the information is displayed in a continuous illumination manner when the display unit is in the first position and the information is displayed in a blinking manner when the display unit is in the second position.

11. The display control apparatus according to claim 1, wherein the display control unit performs control, in the case where the second setting has been set by the setting unit and the display unit is in the second position, such that information that differs from the image captured by the image capturing unit and indicates that the second setting has been set is displayed on the display unit.

12. A display control apparatus comprising:
    an image capturing unit;
    a display unit configured to move into a first position where a display surface of the display unit is oriented in a direction different from a direction in which the image capturing unit performs image capturing and into a second position where the display surface of the display unit is oriented in the direction in which the image capturing unit performs the image capturing, with respect to a main body portion;
    a setting unit configured to set any of a plurality of settings including a first setting, with which a normal image of the image captured by the image capturing unit is recorded, and a second setting, with which a mirror image of the image captured by the image capturing unit is recorded;
    a recording unit configured to perform control such that, in a case where the first setting has been set, a normal image of the image captured by the image capturing unit is recorded in a storage medium and, in a case where the second setting has been set, a mirror image of the image captured by the image capturing unit is recorded in a storage medium; and
    a display control unit configured to perform control, in a case where the first setting has been set by the setting unit, such that a normal image of the image captured by the image capturing unit is displayed when a position of the display unit is the first position, and a mirror image of the image captured by the image capturing unit is displayed when the position of the display unit is the second position, and in a case where the second setting has been set by the setting unit, such that a mirror image of the image captured by the image capturing unit is displayed when the position of the display unit is the first position and also when the position of the display unit is the second position,
    wherein, in both of the case where the first setting has been set and the case where the second setting has been set, a mirror image of the image captured by the image capturing unit is displayed when the display unit is in the second position.

13. A control method for a display control apparatus that includes a display unit configured to move into a first position where a display surface of the display unit is oriented in a direction different from a direction in which the image capturing unit performs image capturing and into a second position where the display surface of the display unit is oriented in the direction in which the image capturing unit performs the image capturing, with respect to a main body portion, and an image capturing unit configured to capture an image, the control method comprising:
    setting, in a case where the display unit is in the first position, any of a plurality of settings, the plurality of settings including a first setting, with which a normal image of the image captured by the image capturing unit is displayed, and a second setting, with which a mirror image of the image captured by the image capturing unit is displayed; and
    displaying, in a case where the first setting has been set, a normal image of the image captured by the image capturing unit when the display unit is in the first position, and a mirror image of the image captured by the image capturing unit is displayed when the display unit is in the second position, and in a case where the display unit is in the second position with the second setting, an image is displayed that has, in terms of left and right, the same orientation as the image displayed when the display unit is in the first position with the second setting,
    wherein, in both of the case where the first setting has been set and the case where the second setting has been set, a mirror image of the image captured by the image capturing unit is displayed when the display unit is in the second position.

14. A control method for a display control apparatus that includes a display unit configured to move into a first position where a display surface of the display unit is oriented in a direction different from a direction in which the image capturing unit performs image capturing and into a second position where the display surface of the display unit is oriented in the direction in which the image capturing unit performs the image capturing, with respect to a main body portion, and an image capturing unit configured to capture an image, the control method comprising:
    setting any of a plurality of settings, the plurality of settings including a first setting, with which a normal image of the image captured by the image capturing unit is recorded, and a second setting, with which a mirror image of the image captured by the image capturing unit is recorded;
    recording, in a case where the first setting has been set, a normal image of the image captured by the image capturing unit is a storage medium and, in a case where the second setting has been set, a mirror image of the image captured by the image capturing unit is recorded in a storage medium; and
    displaying, in a case where the first setting has been set, a normal image of the image captured by the image capturing unit when a position of the display unit is the first position, and a mirror image of the image captured by the image capturing unit is displayed when the position of the display unit is the second position, and in a case where the second setting has been set, such that a mirror image of the image captured by the image capturing unit is displayed when the position of the display unit is the first position and also when the position of the display unit is the second position,
    wherein, in both of the case where the first setting has been set and the case where the second setting has been set, a mirror image of the image captured by the image capturing unit is displayed when the display unit is in the second position.

15. A non-transitory computer readable storage medium storing a program for causing a computer to execute a control method for a display control apparatus that includes a display unit configured to move into a first position where a display surface of the display unit is oriented in a direction different from a direction in which the image capturing unit performs image capturing and into a second position where the display surface of the display unit is oriented in the direction in which the image capturing unit performs the image capturing, with respect to a main body portion, and an image capturing unit configured to capture an image, the control method comprising:
    setting, in a case where the display unit is in a first position, any of a plurality of settings, the plurality of settings including a first setting, with which a normal image of an image captured by the image capturing unit is displayed, and a second setting, with which a mirror image of the image captured by the image capturing unit is displayed; and displaying, in a case where the first setting has been set, a normal image of the image captured by the image capturing unit when the display unit is in the first position, and a mirror image of the image captured by the image capturing unit is displayed when the display unit is in a second position, and in a case where the display unit is in the second position with the second setting, an image is displayed that has, in terms of left and right, the same orientation as the image displayed when the display unit is in the first position with the second setting, wherein, in both of the case where the first setting has been set and the case where the second setting has been set, a mirror image of the image captured by the image capturing unit is displayed when the display unit is in the second position.

16. A non-transitory computer readable storage medium storing a program causing a computer to execute a control method for causing a computer to execute a control method for a display control apparatus that includes a display unit configured to move into a first position where a display surface of the display unit is oriented in a direction different from a direction in which the image capturing unit performs image capturing and into a second position where the display surface of the display unit is oriented in the direction in which the image capturing unit performs the image capturing, with respect to a main body portion, and an image capturing unit configured to capture an image, the control method for comprising:

setting any of a plurality of settings, the plurality of settings including a first setting, with which a normal image of the image captured by the image capturing unit is recorded, and a second setting, with which a mirror image of the image captured by the image capturing unit is recorded;

recording, in a case where the first setting has been set, a normal image of the image captured by the image capturing unit in a storage medium and, in a case where a second setting has been set, a mirror image of the image captured by the image capturing unit is recorded in a storage medium; and displaying, in a case where the first setting has been set, a normal image of the image captured by the image capturing unit when a position of the display unit is a first position, and a mirror image of the image captured by the image capturing unit is displayed when the position of the display unit is a second position, and in a case where the second setting has been set, such that a mirror image of the image captured by the image capturing unit is displayed when the position of the display unit is the first position and also when the position of the display unit is the second position, wherein, in both of the case where the first setting has been set and the case where the second setting has been set, a mirror image of the image captured by the image capturing unit is displayed when the display unit is in the second position.

\* \* \* \* \*